United States Patent [19]

Koto et al.

[11] Patent Number: 4,589,000

[45] Date of Patent: May 13, 1986

[54] INK JET PRINTER OF THE INK-ON-DEMAND TYPE

[75] Inventors: Haruhiko Koto; Junichi Okada; Hiroshi Ishii; Kenji Sawada, all of Shiojiri, Japan

[73] Assignee: Epson Corporation, Tokyo, Japan

[21] Appl. No.: 764,813

[22] Filed: Aug. 12, 1985

Related U.S. Application Data

[62] Division of Ser. No. 541,628, Oct. 13, 1983, abandoned.

[30] Foreign Application Priority Data

| | | | |
|---|---|---|---|
| Oct. 14, 1982 | [JP] | Japan | 57-180176 |
| Dec. 7, 1982 | [JP] | Japan | 57-215263 |
| Jan. 17, 1983 | [JP] | Japan | 58-5501 |
| Jul. 12, 1983 | [JP] | Japan | 58-126668 |
| Jul. 20, 1983 | [JP] | Japan | 58-132162 |
| Aug. 23, 1983 | [JP] | Japan | 58-153660 |

[51] Int. Cl.⁴ .......... G01D 15/16

[52] U.S. Cl. .......... 346/140 R

[58] Field of Search .......... 346/140

[56] References Cited

U.S. PATENT DOCUMENTS

| | | | |
|---|---|---|---|
| 4,376,283 | 3/1983 | Bower | 346/140 |
| 4,419,678 | 12/1983 | Kasugayama | 346/140 |
| 4,463,362 | 7/1984 | Thomas | 346/140 |

*Primary Examiner*—Joseph W. Hartary

*Attorney, Agent, or Firm*—Blum Kaplan Friedman Silberman & Beran

[57] ABSTRACT

An ink-on-demand type ink jet printer includes an ink jet head assembly having a printer head and an ink container integrally joined to the printer head. The printer head includes a pressure chamber and ink supply and ejection flow passages communicating respectively therewith. The ink container includes therein a narrow air-bubble blocking tube opening directly into a lower portion of the interior of the ink container and which connects the ink supply flow passage to the ink container. A vent hole is defined in an upper portion of the ink container. The ink container includes a wall surface with the wall surface not trapping air bubbles, with a surface of the vent hole being coated with a defoaming agent.

1 Claim, 45 Drawing Figures

FIG. 1A
PRIOR ART
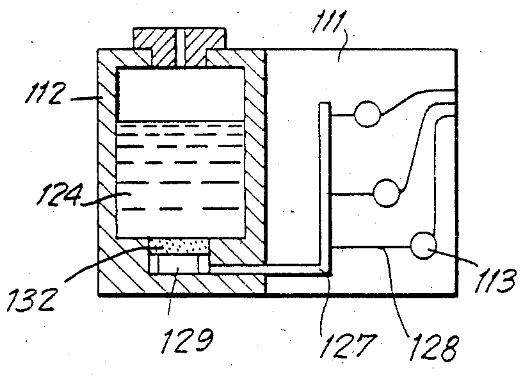
FIG. 1B
PRIOR ART
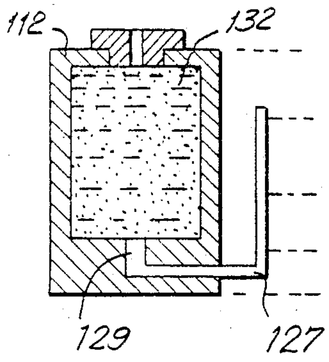
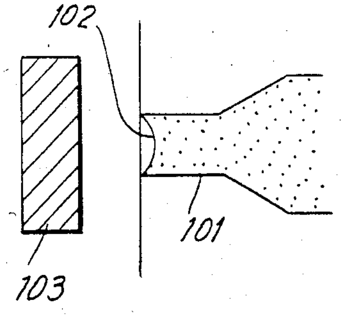
FIG. 2

FIG. 14
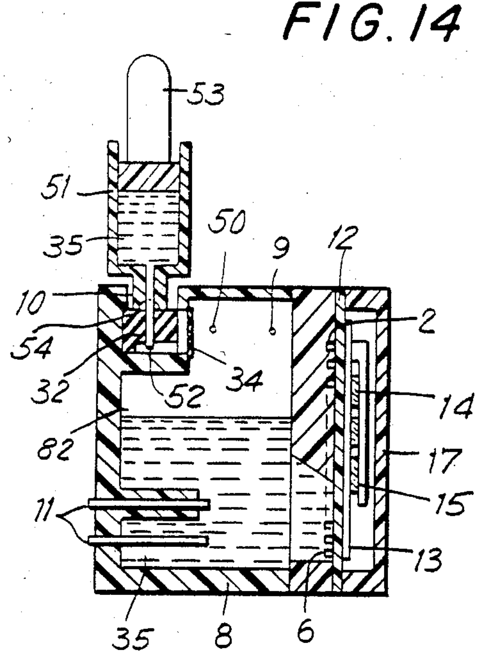
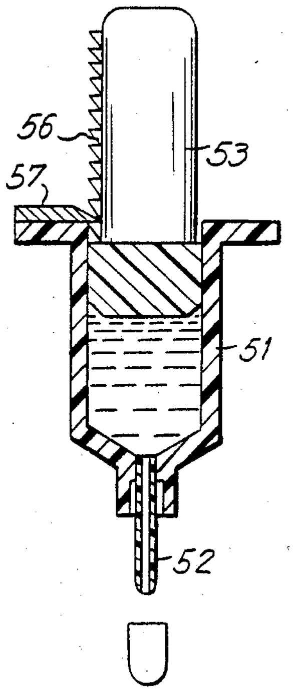
FIG. 15
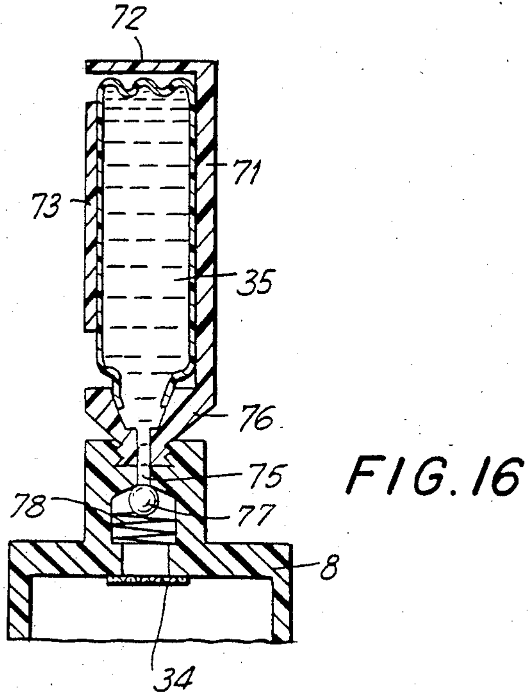
FIG. 16

FIG. 21
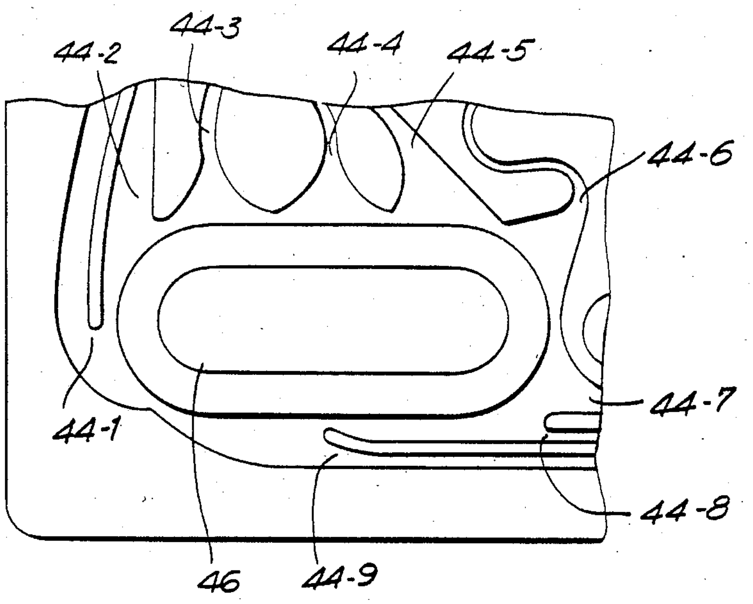
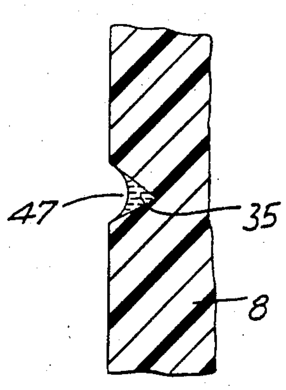
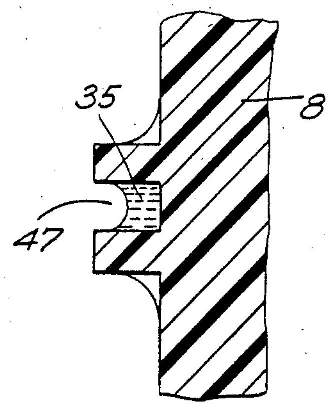
FIG. 22A
FIG. 22B

FIG. 23
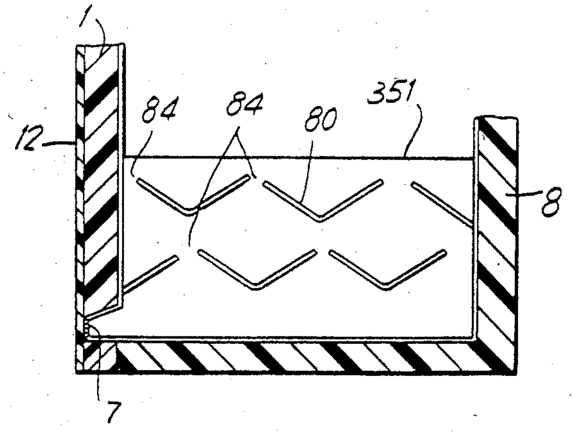
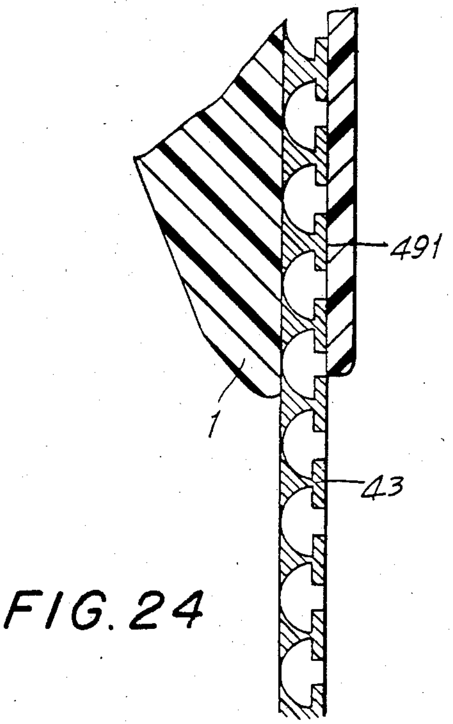
FIG. 24
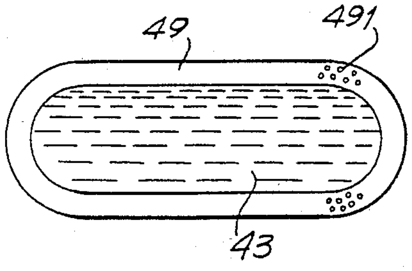
FIG. 25

FIG. 26
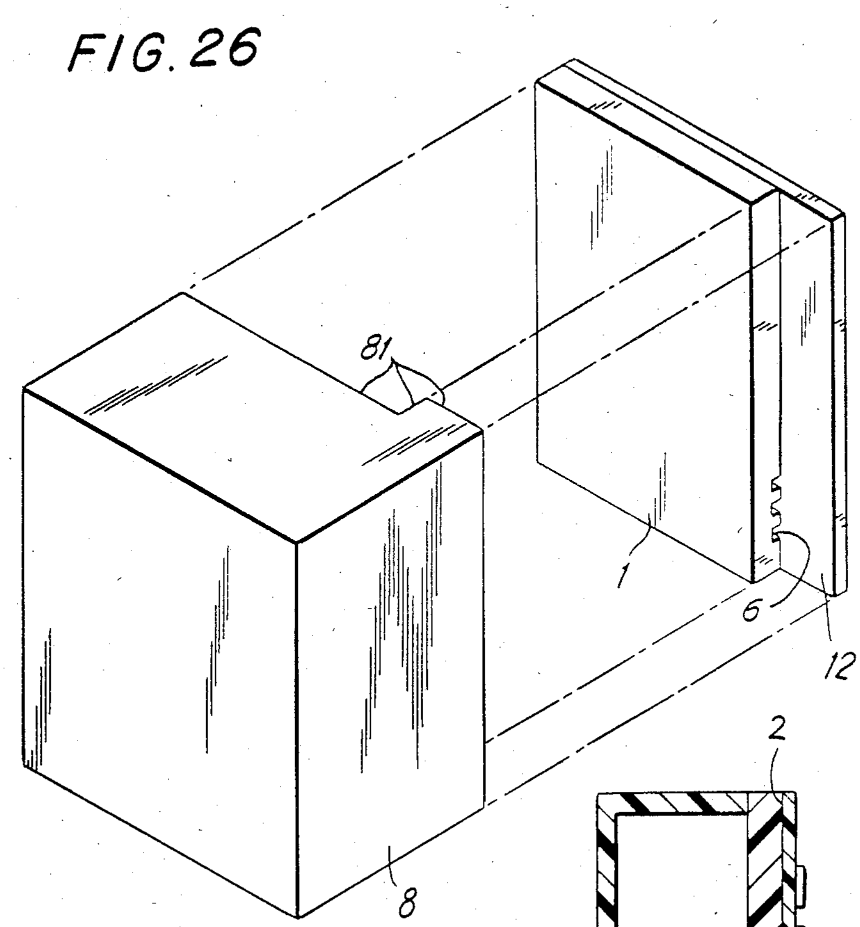
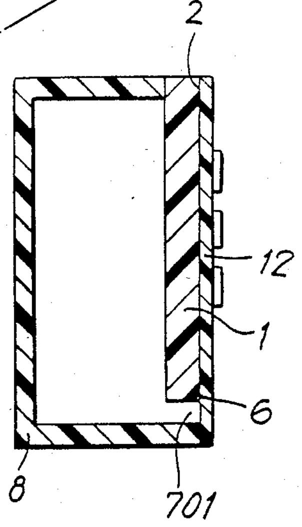
FIG. 27

FIG. 28A
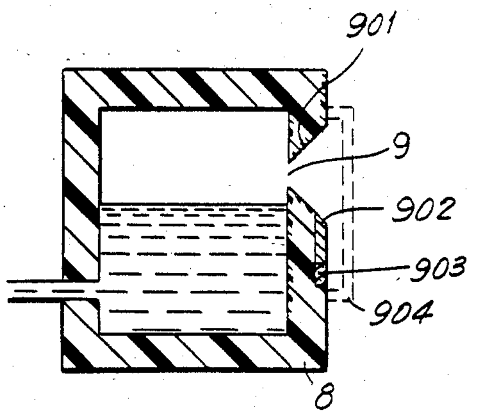
FIG. 28B
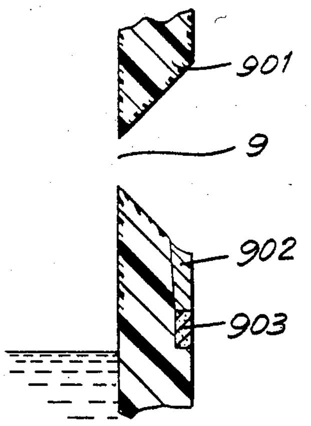
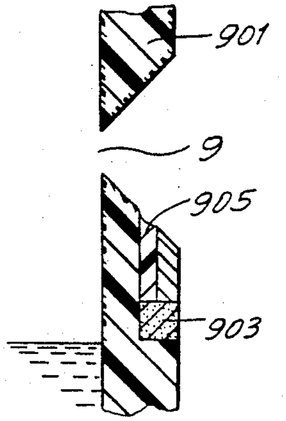
FIG. 28C
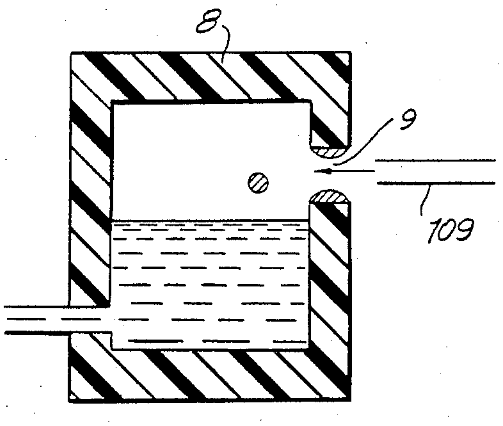
FIG. 30

INK JET PRINTER OF THE INK-ON-DEMAND TYPE

This is a division of application Ser. No. 06/541,628 filed Oct. 13, 1983 now abandoned.

BACKGROUND OF THE INVENTION

This invention relates generally to an ink jet printing device, and more particularly to an ink jet recording device of the ink-on-demand type composed of an ink jet head and an ink container integral therewith and supported on a moveable carriage. There have been known in the prior art ink jet printers of the ink-on-demand type having an integral construction composed of an ink jet head and an ink container. For example, Japanese Laid-Open Patent Publication No. 50-99436 discloses printer heads as shown in FIGS. 1(A) and 1(B) of the accompanying drawings. The arrangement of FIG. 1(A) has a filter 132 disposed in the bottom of an ink container 112 for preventing air bubbles in a body of ink 124 from flowing toward pressurization chambers 113. In the structure of FIG. 1(B), a filter 132 is filled in an ink container 112 for preventing air bubbles from flowing into a flow passage 127. The prior art printer heads as shown in FIGS. 1(A) and 1(B) however allow supersaturated air in the ink to form air bubbles in the filter 132 when the ink is subjected to a temperature rise. Air bubbles which have somehow passed through the filter 132 for any reason tend to be trapped in a portion of the filter 132, the discharge opening 129 or the flow passage 127. In general, the opening 129 and the flow passage 127 have cross sectional areas much greater than the cross sectional area of flow passages 128 communicating with the pressure chambers 113 in the printer head 111. Therefore, it is difficult to force the trapped air bubbles together with the ink out of the opening 129 and the flow passage 127 as the speed of flow of the ink cannot be increased in the opening 129 and flow passage 127. The conventional printer heads are therefore disadvantageous in that air bubbles are likely to be present in the filter 132, the opening 129 or the flow passage 127 at all times, and any such air bubbles which happen to reach the pressure chambers 113 prevent ink from being expelled from the pressure chambers 113.

Another serious problem with the known ink jet recording devices of the ink-on-demand type is that nozzles tend to be clogged with evaporated ink. To solve this problem, the nozzles are normally closed by covers to prevent ink from evaporating from the nozzles. However, experiments conducted by the inventors have revealed that the covers on the nozzles fail to prevent air bubbles from being formed in the head. One reason for such air bubble formation is considered to be the fact that a concave meniscus 102 (FIG. 2) in a nozzle 101 allows air bubbles to be trapped in the nozzle 101 when covered by a cover or lid 103, or the cover 103 as it approaches the nozzle 101 gets wet irregularly with the ink, permitting air bubbles to be trapped in the nozzle 101.

The body of ink in the ink container is kept in contact with air therein through a free interface. This poses another problem in that the ink surface tends to stir when the ink container is moved by a carriage, thus trapping air bubbles in the ink. According to Japanese Laid-Open Utility Model Publication No. 54-86047 and Japanese Utility Model Publication No. 54-8746, horizontal and vertical partitions are employed to prevent the ink surface from being stirred or undulated as illustrated in FIGS. 3 and 4 of the accompanying drawings. The horizontal partitions 151 shown in FIG. 3, however, are disadvantageous in that air bubbles, having entered lower ink chambers or produced due to a temperature change, cannot move upwardly, and small air bubbles tend to be formed which render the printer head incapable of ink ejection. When the ink surface reaches connector holes 153 communicating between the ink chambers 152, the ink surface is more likely to be stirred at the connector holes 153, causing small air bubbles to be created in the ink. If vertical partitions 154 as shown in FIG. 4 are positioned with less spacing to prevent the ink surface from being stirred, then air bubbles once trapped in the ink are interposed between the partitions 154 and fail to go upwardly. Conversely, if the partitions 154 are spaced more widely, small air bubbles are liable to occur at the free ink surface.

What is needed is an ink jet printer designed to prevent air in the ink from interfering with ejection of ink from the jet nozzle.

SUMMARY OF THE INVENTION

Generally speaking in accordance with the invention, there is provided an ink-on-demand type ink jet printer comprising an ink jet head assembly having a printer head and an ink container integrally joined to the printer head. The printer head includes pressure chambers and ink ejection passages communicating respectively therewith, the ink container having therein an air-bubble blocking tube opening directly into a lower portion of the interior of the ink container, a vent hole defined in an upper portion thereof, and a wall surface which does not trap air bubbles. The printer head has nozzles communicating respectively with the ink ejection passages and an ink supply port for supplying ink to the printer head, the ink supply port lying substantially flush with the nozzles and the pressure chambers in normal printing operation and being disposed downwardly of and in substantially diagonal relation to the nozzles. The ink container comprises an ink charging unit having an ink charging port for intimate engagement with an ink output port of an ink charging cartridge at the time of ink replenishment, a main chamber for accommodating a substantial amount of ink, a filter disposed between the ink charging unit and the main filter, a vent hole defined in an upper portion of the main chamber, and an ink supply port defined in a lower portion of the main chamber for supplying ink to the printer head.

Accordingly, it is an object of the present invention to provide an improved printer head which will produce fewer air bubbles due to temperature changes and is capable of discharging air bubbles generated in an ink flow passage.

Another object of the invention is to provide an improved printer having a print head and an ink container of integral construction designed such that air bubbles generated in the ink container will not enter ink flow passages in the head.

Still another object of the invention is to provide an improved ink jet recording device having clog prevention means for preventing air bubbles from going from nozzles into an ink flow passage.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 1(A) and 1(B) are cross-sectional views of conven-tional integral constructions composed of a head and an ink container;

FIG. 2 is a schematic diagram showing a concave meniscus in a nozzle;

FIG. 14 is a sectional view showing the manner in which ink is charged into the ink container with the ink charging cartridge illustrated in FIG. 8;

FIG. 15 and 16 are sectional views of alternative embodiments of ink charging cartridges;

FIG. 21 is a front elevational view of FIGS. 20(A) and 20(B);

FIGS. 22(A) and 22(B) are enlarged fragmentary sectional views of ink passages defined in the interior of the ink container in accordance with the invention;

FIG. 23 is a fragmentary sectional view of another alternative embodiment of an integral construction of a head and ink container in accordance with the invention;

FIG. 24 is an enlarged fragmentary view of a filter and a head substrate which are joined together;

FIG. 25 is a plan view of a filter in accordance with the invention;

FIG. 26 is an exploded perspective view of an integral construction of a head and an ink container according to still another alternative embodiment of the invention;

FIG. 27 is a sectional view of the construction, as assembled, of FIG. 26;

FIG. 28(A) is a sectional view of a vent hole in an ink container in accordance with another embodiment of the invention;

FIGS. 28(B) and 28(C) are enlarged cross-sectional views of vent holes in accordance with other alternative embodiments;

FIGS. 30 through 32 are cross-sectional views of vent holes of still other embodiments;

DESCRIPTION OF THE PREFERRED EMBODIMENTS

Figure 3:
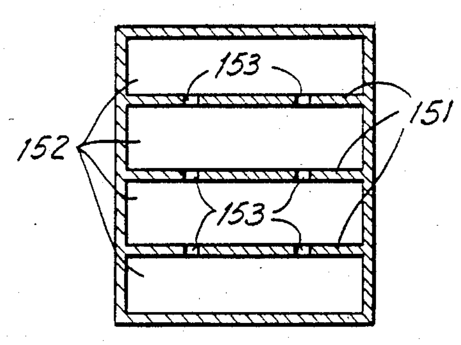
FIG. 3 PRIOR ART
FIGS. 3 and 4 are views showing earlier ink container constructions.
Figure 4:
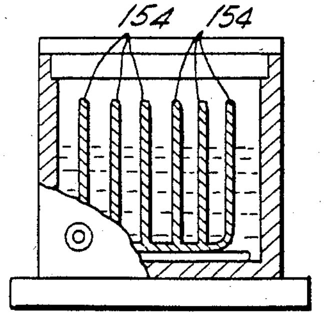
FIG. 4 PRIOR ART
Figure 5:
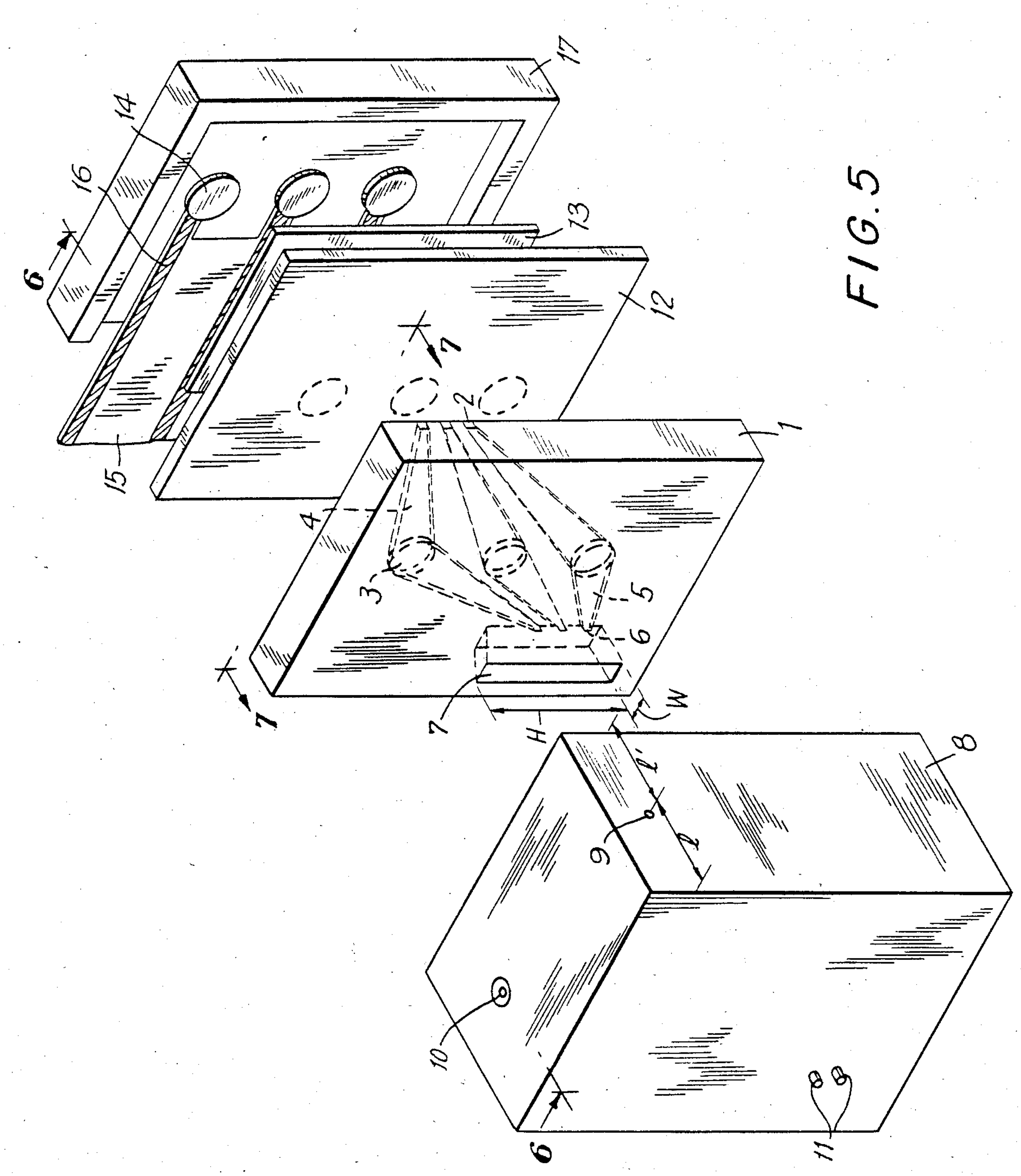
FIG. 5 is an exploded perspective view of an integral construction of a head and an ink container in accordance with the present invention.
Figure 6:
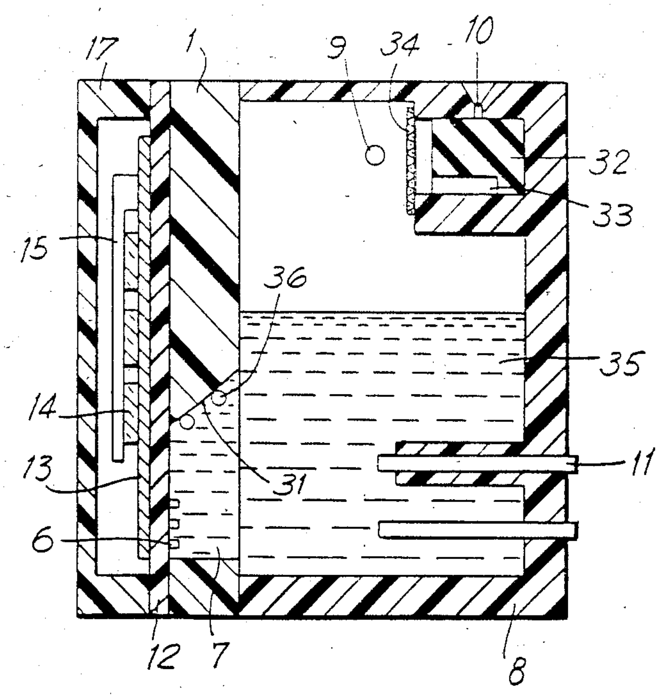
FIG. 6 is a sectional view taken along line 6—6 of FIG. 5, showing the construction as assembled.

An integral construction including an ink jet head and an ink jet container in accordance with an embodiment of the invention is now described with reference to FIGS. 5, 6 and 7. FIG. 5 is an exploded perspective view of the integral construction; FIG. 6 is a cross-sectional view showing the construction from behind the nozzles, and FIG. 7 is a side elevational view showing the shapes of ink flow passages.

A substrate 1 is made of ABS resin or polysulfone by injection molding and has a thickness of 3 mm. The substrate 1 has in one surface thereof nozzles 2, pressure chambers 3, ejection flow passages 4 interconnecting the pressure chambers 3 and the nozzles 2, supply flow passages 5 for supplying ink into the pressure chambers 3, and ink flow passages 6 such as narrow airbubble blocking tubes defined at distal ends of the supply flow passages 5. Each of the nozzles 2 has a cross section of dimensions 50 $\mu m \times 50$ $\mu m$ and a length of 100 $\mu m$. Each of the ejection flow passges 4 has a depth of 200 $\mu m$, a width of about 1 mm, and a length of about 10 mm.

Each pressure chamber 3 has a depth of 200 $\mu m$ and a diameter of 3 mm. Each supply flow passage 5 has a depth of 200 $\mu m$ and a length of about 10 mm. Each of the narrow air-bubble blocking tubes 6 has a cross section dimensioned 45 $\mu m \times 45$ $\mu m$ and a length of 100 $\mu m$. These ink flow passges, chambers, and tubes are interconnected smoothly so that there are no abrupt changes in the cross sections.

Figure 7:
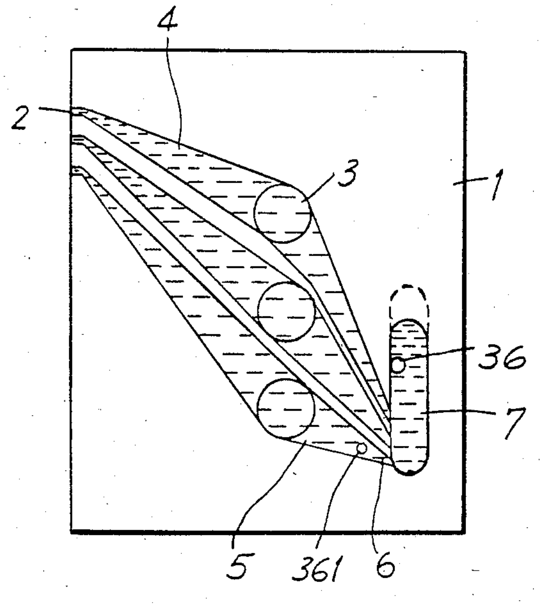
FIG. 7 is a side elevational view taken along line 7—7 of FIG. 5.

As shown in FIG. 7, the joined ink passageways extending from the narrow air-bubble blocking tubes 6 to the nozzles 2 are shaped such that the nozzles 2 are in a higher position in a normal printing posture of the printer head. The substrate 1 also has an ink supply port 7 communicating with the narrow air-bubble blocking tubes 6 and opening away from the ink passageways, the ink supply port 7 having a width of 0.8 mm and a height of 8 mm. The ink supply port 7 constitutes part of an inner wall of an ink container 8.

It should be understood that the particular dimensions given above and hereinafter are representative of values and proportions which have performed satisfactorily, but these dimensions are not limiting. Different dimensions will be satisfactory for different materials, inks, sizes of the print head, ink containers etc., and their particular applications.

The ink container 8, which is transparent, is made of polysulfone or ABS resin by injection molding and bonded to the substrate 1 by a solvent. The ink container 8 has a vent hole 9 communicating with the exterior of the ink container 8 and positioned at an upper portion thereof substantially equidistant from opposite sides of the ink container 8 (l=l'). The ink container 8 has an ink charging port 10 defined in an upper wall thereof. A pair of ink detector terminals 11 extend through a side wall of the ink container 8 into the interior thereof, the upper ink detector terminal being covered with a cylindrical sleeve extending from the side wall into the ink container 8.

A vibratory plate 12 of ABS resin or polysulfone is attached to the substrate 1 by solvent cement. An electrode plate 13 of stainless steel is bondedd to the vibratory plate 12, and piezoelectric elements 14 are bonded to the electrode plate 13. A flexible substrate 15 of FPC includes electrodes 16 soldered to the piezoelectric elements 14 and the electrode plate 13. A cover 17 of ABS resin is bonded by a solvent to the vibratory plate 12 for preventing the electrode plate 13, the piezoelectric elements 14, and the flexible substrate 15 from getting wet with ink.

The arrangement of FIG. 5 is now described in more detail with reference to FIG. 6. The ink supply port 7 has a slanted upper edge 31 extending at an angle of 30 degrees or more to the horizontal plane. The ink container 8 accommodates therein a plug 32 of butyl rubber disposed below the ink charging port 10, there being a groove 33 defined in the plug 32 and opening downwardly. A filter 34 made of stainless steel mesh and having a mesh size of about 30 μm is located in the ink container 8 and fused to an inner surface thereof through thermal fusion. The ink container 8 contains a body of ink 35.

Operation of the foregoing construction is now described. During normal printing operation, nozzle covers and a vent hole cover are removed, and a signal from a control circuit (not shown) is applied through the flexible substrate 15 to the piezoelectric elements 14 to reduce the volumes of the pressure chambers 3 for expelling ink 35 from the nozzles 2 onto a recording medium (not shown). The printer head is moved by a carrier (not shown) reciprocally across the recording medium. Thus, the printer head serves as a printer head of a so-called serial printer.

When air bubbles 36 are trapped in the ink 35 in the ink container 8, they move upwardly under the influence of gravity and do not reach the narrow air-bubble blocking tubes 6. Even when the air bubbles 36 reach the narrow air-bubble blocking tubes 6, those air bubbles 36 which are greater in size than the tubes 6 cannot find their way into the tubes 6, but instead move upwardly in the ink supply port 7, then go up along the slanted upper edge 31 until they arrive at the upper surface of the ink body 35. Minute air bubbles can pass through the narrow air-bubble blocking tubes 6, but those air bubbles fail to prevent ink ejection and will be expelled through the nozzles 2 together with the ink.

When the level of the ink 35 is lowered below the detector terminals 11 as the ink is discharged from the ink container 8, a detector circuit (not shown) detects a change in the electrical resistance of a circuit including the detector terminals 11 and indicates that the ink supply has been depleted. Then, the user covers the nozzles 2, and, while leaving the vent hole 9 open, inserts a needle 52 of an ink charging cartridge 51 (FIG. 8) into the ink charging port 10 unitl the needle 52 penetrates through the rubber plug 32. Thereafter, a piston 53 of the ink charging cartridge 51 is depressed with a finger to charge ink from the cartridge 51 into the ink container 8. When the ink level in the ink container 8 is raised up to a certain position below the nozzles 2, ink charging is stopped and the nozzles 2 are uncovered. Then, normal printing operation can be resumed.

FIGS. 26 and 27 illustrate another embodiment of an integral construction of a head and an ink container which are kept in communication by narrow air-bubble blocking tubes. According to this embodiment, narrow air-bubble blocking tubes 6 are defined in an end wall of a substrate 1, and an ink container 8 has a stepped surface 81 shaped in complementary relationship to the end wall of the substrate 1. As shown in FIG. 27, the ink container 8 and the substrate 1 jointly define an ink supply port 701 which is a functional equivalent to the ink supply port 7 shown in FIG. 5.

As described above, during normal ink ejection, the ink container 8 itself serves as a air trap to prevent air bubbles from entering the printer head. Since the ink container 1 is not made of a porous material such as sponge as is conventional as shown in FIG. 1, no small air bubbles are formed in the ink container 1 even when left in a high-temperature environment, and hence no air bubbles grow in the small air-bubble blocking tube 6. Any air bubbles 36 produced in the ink container 8 move upwardly due to the effect of gravity until they reach the upper surface of the ink body 35. An air bubble 361 created in the ink passageway in the printer head as shown in FIG. 7 moves upwardly in the ink passageway and locates in the vicinity of the nozzle 2. Prior to the next ink ejection cycle, the nozzles 2 are uncovered while the vent hole 9 remains covered, and the needle 52 of the ink charging cartridge 51 is inserted into the ink charging port 10. Then, ink is charged into the ink container 8 to increase the pressure within the ink charging cartridge 8 to thereby discharge the trapped air bubble 361 together with the ink through the nozzle 2.

In the embodiments illustrated in FIGS. 5 through 8 and FIGS. 26, 27, the narrow air-bubble blocking tubes 6 open directly into the lower portion of the ink container 8, and the tubes 6 and the pressure chambers 3 are interconnected by the supply flow passages 5. The air bubbles 36 produced in the ink 35 in the ink container 8 are blocked by the narrow air-bubble blocking tubes 6 and move upwardly in the ink container 8. The air bubbles 361 having passed through the narrow air-bubble blocking tubes 6 can easily be discharged from the nozzles 2 without being trapped somewhere in the ink passageways simply by increasing the pressure in the ink container 8 since the ink passageways extending from the narrow air-bubble blocking tubes 6 to the nozzles 2 are of substantially the same depth throughout their entire length and have smoothly interconnected cross-sectional areas without interruptions or abrupt changes.

In accordance with the arrangement shown in FIGS. 5, 6 and 7, since the substrate 1, vibratory plate 12, ink container 8, and cover 17 are bonded together through flat surfaces, it is easy to apply the solvent or the solvent cement to these flat surfaces, and these members can be sealed completely against each other with a small amount of solvent. This prevents the nozzles 2 from being clogged by an excessive quantity of solvent and avoids a reduction in the strength of the bonded components. The parts are made of ABS resin or polysulfone and thus can be bonded together by a solvent with substantially the same strength as that of the components themselves. The components are therefore prevented from being peeled off and sealed insufficiently at high temperatures and high humidity. Since a portion of the head substrate 1 serves as part of the wall of the ink container 8 and the ink passageways in the head open directly in the ink container 8, the overall construction is relatively simple, with the result that a printer head can be manufactured easily and inexpensively. The narrow air-bubble blocking tubes 6 can be formed simultaneously with the other passages when the head substrate 1 and the vibratory plate 12 are assembled together, so that there is no need for another component to be added in forming the narrow air-bubble blocking tubes 6.

Because the ink passageways extending from the narrow air-bubble blocking tubes 6 to the nozzles 2 are inclined upwardly, as shown in FIG. 7, any air bubbles generated in the ink passageways tend to collect in the vicinity of the nozzles 2 while the printer head is left unused for a long period of time, and hence can easily be discharged.

Figure 33A:
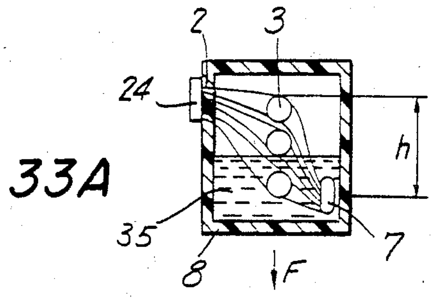
FIGS. 33(A) through 33(E) are cross-sectional views illustrative of various postures of the integral construction of the head and the ink container of the present invention.

The ink jet head illustrated in FIG. 5 has another advantage of better portability. Such better portability is achieved by the fact that the ink supply port 7 is located in substantially a diagonal relationship to the nozzles 2. More specifically, as shown in FIG. 33(A), when the nozzles 2 are covered by a cover 24, the vent hole 9 is covered by a cover 91, and the ink container 8 is subjected to an external force of 100 G, for example, in the direction of the arrow F, and a vacuum of 3 meters $H_2O$ acts on the ink supply port 7 since h=30 mm. Under the applied vaccum, the outer walls of the pressure chambers 3 flex inwardly to force the ink in the ink passageways into the ink container 8 through the narrow air-bubble blocking tubes 6. Upon release of the external force, the outer walls of the pressure chambers 3 return to the original shape to cause the ink 35 to flow back from the narrow air-bubble blocking tubes 6. Since the ink supply port 7 is covered with the ink 35 at this time, no air is admitted into the ink passageways.

Figure 33B:
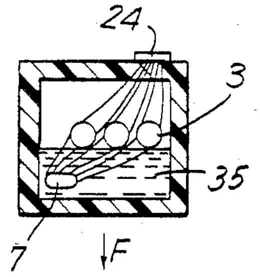
Figure 33C:
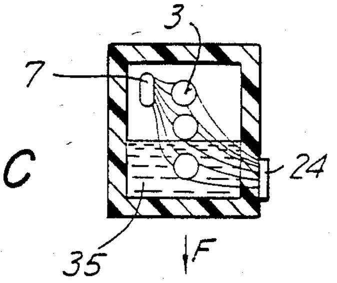
Figure 33D:
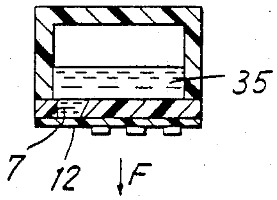
Figure 33E:
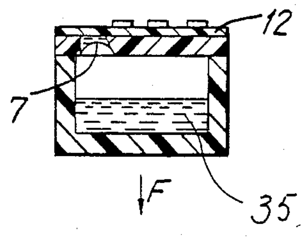

When the printer device falls down as shown in FIG. 33(B) and is subjected to an external force in the direction of the arrow F, the ink supply port 7 is covered with the ink 35 to prevent air from entering the ink passageways, as with the arrangement of FIG. 33(A). When the printer head is turned upside down and is subjected to an external force applied in the direction of the arrow F as illustrated in FIG. 33(C), a positive pressure acts on the ink passageways in the printer head causing the outer walls of the pressure chambers 3 to flex outwardly, whereupon the ink flows from the narrow air-bubble blocking tubes 6 into the head allowing air to enter the tubes 6. When the external force is released, the outer walls of the pressure chambers 3 return to the original configuration to force the trapped air out of the tubes 6, so that there is no tendency for any air to be left in the ink passageways. Likewise, when an external force is imposed on the printer head in a direction opposite to that of the arrow F shown in FIG. 33(B), no air enters the ink passageways. When an external force is applied to the printer head while the latter is positioned with the vibratory plate 12 facing down as shown in FIG. 33(D), air does not find its way into the ink passageways since the ink supply port 7 is covered with the ink 35. When the printer head is subjected to an external force imposed in the direction of the arrow F while the vibratory plate 12 is facing upwardly as illustrated in FIG. 33 E, ink is prevented from flowing out due to surface tension in the narrow air-bubble blocking tubes 6 and thus air is prevented from entering the ink passageways since the depth of the ink passageways is 200 $\mu$m at most and the pressure developed due to the external force of 100 G is 20 cm $H_2O$ at most. As described above, the nozzles 2 are positioned in substantially diagonal relationship to the ink supply ports 7, and there is no danger of air finding its way into the ink passageways under external forces no matter what posture the printer head takes provided that the nozzles are covered.

Figure 34:
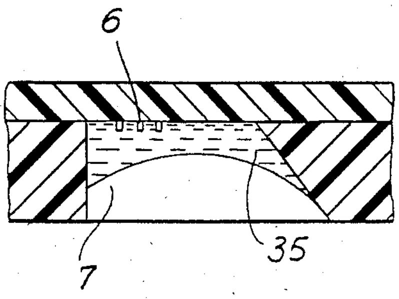
FIG. 34 is an enlarged fragmentary cross-sectional view of an ink supply port in the ink container positioned as shown in FIG. 33.

Another reason for better portability of the ink jet head illustrated in FIG. 5 is now described. Better portability is accomplished by the shape of the ink supply port 7. As described above, the ink supply port 7 has a width of 0.8 mm, a height of 8 mm, and a length (depth) of 3 mm. With such dimensions, even when the ink jet head is left for a prolonged period of time at a high temperature while in the posture of FIG. 33(C) or 33(E), a large quantity of ink 35 is retained in the ink supply port 7 as illustrated in FIG. 34, and it takes quite a long period of time for the interface between the ink and air to reach the narrow air-bubble blocking tubes 6 upon evaporation of the ink. As a consequence that there is no practical danger of any air entering the ink passageways.

With the conventional arrangement of FIG. 1, when the ink jet head, as it is turned over, is left at a high temperature, air enters the porous filter as the ink is dried. After the ink jet head has been brought to a normal posture, many air bubbles are left in the filter and tend to flow into the pressure chambers for several reasons, making it impossible to eject the ink. In accordance with the invention, however, the ink jet head even after being turned over and left in a high-temperature environment can be rendered capable of ejecting ink immediately when the ink jet head is brought back to the normal printing position.

If the width of the ink supply port 7 is smaller, then the ink supply port 7 has a greater force for retaining the ink therein. However, if the width of the ink supply port 7 were made smaller than 0.3 mm, then air bubbles would not go upwardly and would be trapped somewhere, even in the printing posture. Therefore, the width of the ink supply port 7 should not be excessively small. If the width were greater than 1 mm, then the amount of ink that could be retained in the ink supply port 7 would become quite small. It is advantageous for a better ink retentive capability to reduce the width of the ink supply port closer to the narrow air-bubble blocking tubes and increase the width of the ink supply port further from these tubes, that is, to provide the ink supply port with a tapered configuration. The height of the ink supply port 7 should be as large as possible to prevent air bubbles from flowing into the narrow air-bubble blocking tubes 6. If the height were too large, then the ink would flow downwardly when the ink jet head is turned over as shown in FIG. 33(C), resulting in difficulty in retaining the ink 35 in the narrow air-bubble blocking tubes 6. The height of the ink supply port should preferably be up to 20 mm.

In the embodiment of FIG. 5, the vent hole 9 is positioned in the upper portion of the ink container 8 equidistant from the opposite sides thereof. This structural feature prevents the ink 35 from being expelled from the vent hole 9 when the head undergoes accelerated lateral reciprocal movements with respect to the recording medium. If the vent hole 9 were positionally displaced to one side of the head, then ink would tend to flow out of the vent hole 9 when the head is reversed in motion on that side during reciprocating movements of the head.

Since the vent hole 9 and the nozzles 2 are oriented in the same direction, the cover for the nozzles 2 and the cover for the vent hole 9 can easily be located.

The upper detector terminal 11 is encased in a cylindrical sleeve, which allows ink to come off the detector terminal smoothly when the quantity of ink is progressively reduced. This enables accurate detection of an ink shortage.

With the foregoing embodiments of the present invention, the ink container is coupled directly to the printer head having the narrow air-bubble blocking tubes, attached to the ends of the ink supply passages, communicating with the pressure chambers. This arrangement reduces air bubbles produced due to a temperature variation, and allows any air bubbles created in the ink passageways to be quickly discharged. By appropriately selecting the position and shape of the ink supply port, entry of air bubbles into the ink passgeways can be held to a minimum while the ink jet head is carried around.

In the preceding embodiments, the narrow air-bubble blocking tubes provided between the ink container and the ink passage ways in the ink jet head serve to prevent entry of air bubbles into the ink passageways.

An ink jet head construction, which is described as follows includes a filter disposed between an ink container and ink passageway in an ink jet head. The head is designed to allow any air bubbles generated in the ink container to be rapidly discharged against unwanted entry into the ink passageways.

Figure 17:
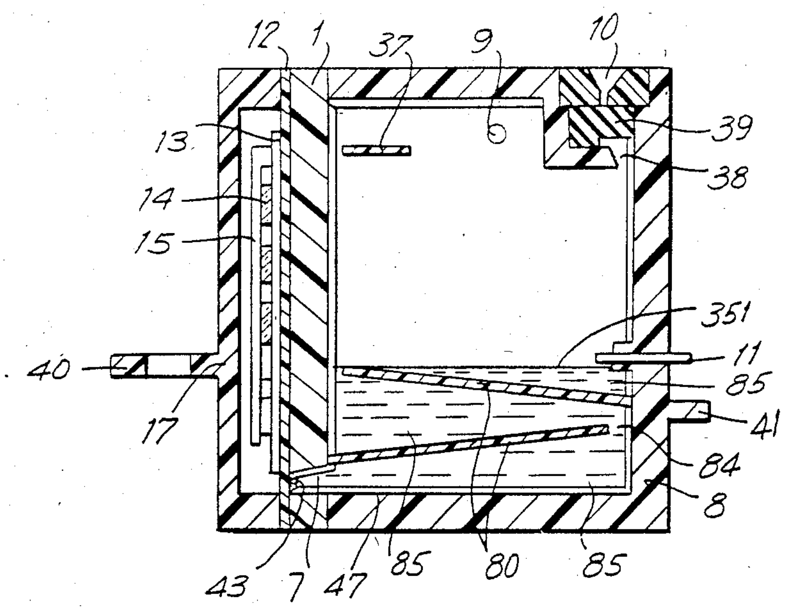
FIG. 17 is a sectional view of an alternative embodiment of integral construction including a head and an ink container in accordance with the invention.
Figure 19A:
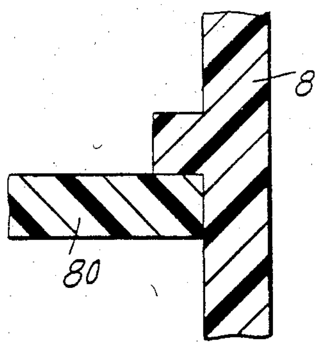
FIGS. 19(A) and 19(B) are enlarged fragmentary views of a structure by which a slant partition shown in FIG. 17 is fixed.
Figure 19B:
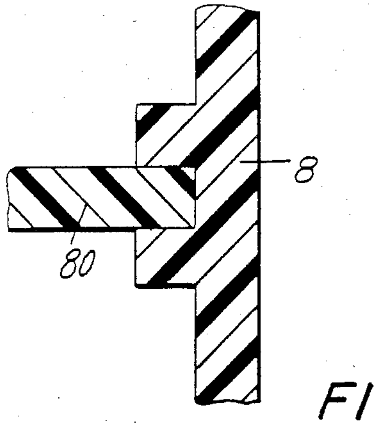

As shown in FIG. 17, a substrate 1 and a vibratory plate 12 are bonded together with ink passageways defined adjacent to bonded surfaces thereof, the substrate 1 having an ink supply port communicating with the interior of an ink container 8 for supplying ink into the ink passageways. An electrode plate 13 is bonded to the vibratory plate 12, and piezoelectric elements 14 are bonded to the electrode plate 13 in positional alignment with the ink passageways. A flexible substrate 15 of FPC is bonded to the electrode plate 13 and the piezoelectric element 14 for feeding an electric current to them. A cover 17 is attached to the vibratory plate 12 for preventing ink from adhering to the electrode plate 13 and the piezoelectric element 14 and causing an insulation failure. The cover 17 has an attachment lug 40 for securing the printer head. The ink container 8 also has an attachment lug 41. The printer head is secured to a carriage (not shown) by these attachment lugs 40, 41. The ink container 8 has therein a pair of upper and lower slanted partitions 80 inclined at an angle of 5 degrees or more and dividing the interior of the ink container 8 into upper and lower ink chambers. The slanted partitions 80 have connecting holes 84 communicating with the ink chambers 85. Each of the slanted partitions 80 may be positioned in interfitting relationship to the ink container 8 as shown in FIGS. 19(A) and 19(B) to provide a sufficient seal against passage of small air bubbles. The slanted partitions 80 may otherwise be bonded to the ink container 8.

A plurality of detector terminals 11 are supported in a horizontal plane on the ink container 8 for detecting the lowest level 351 of the ink in response to a variation in electrical resistance between the detector terminals 11. The ink container 8 has a vent hole 9 through which the interior of the ink container 8 is vented to atmosphere, an ink charging port 10, and an upper ink limit indicator plate 37 which is made of Teflon and white in color. The upper ink limit indicator plate 47 is located slightly lower than the vent hole 9. The upper ink limit indicator plate 37 remains white in color and repels the ink unless completely immersed in the ink. The upper ink limit indicator plate 37 cannot be dyed by the ink. The indicator plate 37 may be made of other materials painted or coated with Teflon, or having the same property as that of Teflon. A resilient body 39 is fitted between the ink charging port 10 and an inlet port 38 opening into the interior of the ink container 8.

Figure 20A:
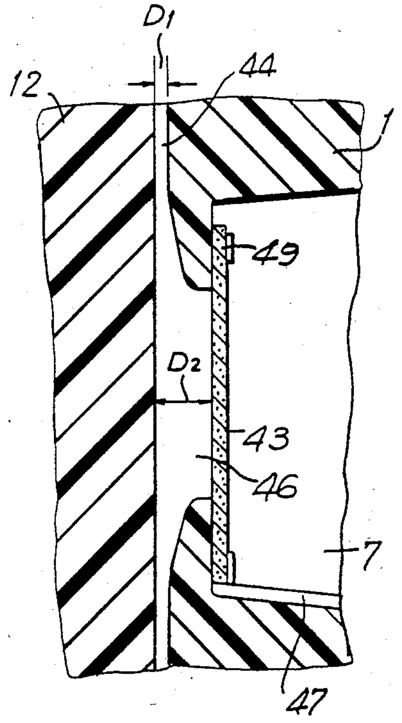
FIGS. 20(A) and 20(B) are enlarged fragmentary side elevational views of head filters in accordance with the invention.

The ink container 8 and the ink supply port 7 provide an ink passage 47 as shown in FIG. 22(A) or 22(B). The ink passage 47 extends over substantially the entire inner wall surface of the ink container 8, and also over the inner wall surface of the substrate 1. As shown in FIG. 20(A), the ink supply port 7 has a filter 43 disposed in an inner end thereof and a rear chamber 46 defined behind the filter 43 and having a depth $D_2$ which is no greater than ten times, preferably no greater than three times the depth $D_1$ of an ink passageway 44 defined between the substrate 1 and the vibratory plate 12.

As illustrated in FIG. 25, the filter 43 has a fused outer peripheral edge 49 having a multiplicity of staking holes 491 larger than apertures in the filter 43 and staked with heat in the substrate 1 as shown in FIG. 24. Each of the staking holes 491 has a diameter in the range of from 40 to 200 μm so that the filter 43 is mechanically secured firmly to the substrate 1 after it has been staked with heat. The filter 43 is prepared by electroforming a nickel sheet or etching a stainless steel sheet, and has a small thickness ranging from 10 to 20 μm. The filter 43 presents a small flow resistance, and is of a reduced area with a small ratio of filter apertures. Since the filter 43 is a reduced thickness and has its apertures opening rectilinearly, it prevents air bubbles from being trapped therein.

Figure 8:
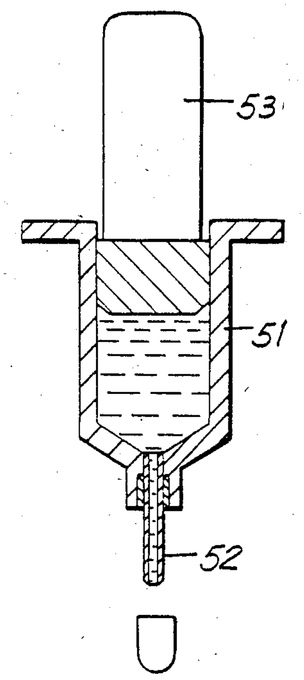
FIG. 8 is a sectional view of an ink charging cartridge in accordance with the invention.

The ink is introduced into the ink container 8 by inserting cartridge needle 52 as shown in FIG. 8 from the ink charging port 10 through the resilient body 39. The ink supplied from the needle 52 can be charged along the inner wall surface of the ink container into the latter without forming air bubbles. As the ink is charged, the ink level is raised until it goes beyond the upper ink limit indicator plate 37, whereupon the color thereof changes to the color of the ink. Accordingly, it can be readily observed that the ink container 8 is now full of ink. The charging of ink is now completed. When the needle 52 is pulled out of the resilient body 39, the opening pierced in the resilient body 39 closes to prevent any ink from going therethrough toward the ink charging port 10.

The ink container 8 may be inverted or turned over prior to printing operation, and air bubbles (air pockets) may be present anywhere in the ink container 8. It is necessary to allow such air bubbles to go upwardly immediately after the ink container 8 has been brought to a normal posture.

With the slanted partitions 80 extending at an angle of 5 degrees or more with respect to the horizon, any air bubbles in the lower ink chamber 85 tend to move through the connector hole 84 toward the ink surface without the tendency of flowing through the ink supply port 7 toward the ink jet head. More specifically, when the printer head assembly with the integral ink container is held at rest under printing condition, air bubbles in the ink chambers are gathered in the upper ink region. No small air bubbles are generated in the vicinity of the ink supply port 7 when the carriage is vibrated during movement. Even when the ink container 8 is vibrated to stir the ink therein, the air bubbles adjacent to the ink level 351 are prevented from flowing toward the ink supply port 7 faster than the ink itself. In order for large air bubbles to go upwardly through the connector hole 84, the diameter of the connector hole 84 should be in the range of from 1.5 to 2 mm, or the connector hole 84 should be in the form of a slit having a width ranging from 1 to 2 mm.

The surfaces of the ink container 8 and the slanted partitions 80 may be treated so that they can easily be wet with ink. This easily prevents air bubbles from being formed and trapped in the ink.

Air bubbles trapped in the ink range from a few microns in diameter to a few millimeters. Since the larger air bubbles are more buoyant, they are less liable to be attached to the wall surface and more likely to move upwardly. Those small air bubbles which have diameters ranging from several tens to several hundred microns are less buoyant, and thus are more liable to stick to the wall surface. Assuming that the surface tension of the ink is expressed by H and the diameter of an air bubble by D, the pressure in the air bubble is increased by 4H/D. The increase in the air bubble pressure results in an increase in the solubility of air into ink. Accordingly, air bubbles having diameters smaller than a certain diameter are dissolved in the ink. For example, it can be confirmed that an air bubble having a diameter of 60 microns will be dissolved in apparently saturated ink within about five minutes.

An air bubble that is 10 microns across will be dissolved in such ink in less than 5 seconds. With the ink container according to the illustrated embodiment, ink below the uppermost connector hole 84 is continuously discharged through the ink supply port 7, and any small air bubbles as they flow downwardly through the lower connector hole 84 are dissolved and disappear before they reach the ink supply port 7. Even where no provision is made for preventing the ink in the ink container from being stirred, the ink in the ink chamber 85 below the lowermost ink level 351 remains unstirred, and any small air bubbles are dis-solved in the ink in the long period of time before they arrive at the ink supply port 7. This allows the ink container 8 to be simple in construction and to store an increased amount of usable ink, there being no conventional partitions in the ink container in its region filled with the ink.

When the ink container is replenished, ink flows down from the ink charging port 10. With conventional arrangements in which partitions are disposed above the lowermost ink level 351, it has been necessary for the ink in the uppermost chamber to be replaced with air in the next lower chamber, and so on for the ink in the successively lower chambers, through small connector holes 84, with the result that it has taken a long interval of time before the ink container is completely replenished with ink. However, since no partitions are present in the ink filling region in the ink container of the invention, ink can be supplied into the ink container quite rapidly.

As shown in FIG. 23, each slanted partition 80 may have a plurality of connector holes 84. The basic requirement is that ink be discharged through the ink supply port 7 successively from the lower ink chambers. Since the slanted partitions 80 have many connector holes 84 in FIG. 23, any air bubbles in the ink can move upwardly when the ink container is brought from an inverted position to a normal position. With the angles of inclination of the slanted partitions 80 being constant, the height of each slanted partition can be reduced so that the lowest ink level can be lowered for storing an increased quantity of usable ink in the ink container.

Where each slanted partition 80 has a single connector hole 84 as shown in FIG. 17, ink is completely free from unwanted mixing and highly immune to entrapment of air bubbles as the ink is discharged through the ink supply port 7 successively from the lower ink chambers.

To prevent air from being left in the rear chamber 46, ink passageways 44-1 through 44-9 extend from the entire periphery of the rear chamber 46 to the respective nozzles as shown in FIG. 21. The ink passageways 44-1 through 44-9 are interconnected through smoothly blending configurations to prevent the ink flow from becoming stagnant therein. The rear chamber 46 is of a thin profile such that the ink will not flow therein at an extremely low speed as compared with that of flow in the ink passageways thus prohibiting air bubbles from staying therein upon purging when the air bubbles are pushed out of the nozzles in preparation for ink ejection.

Figure 20B:
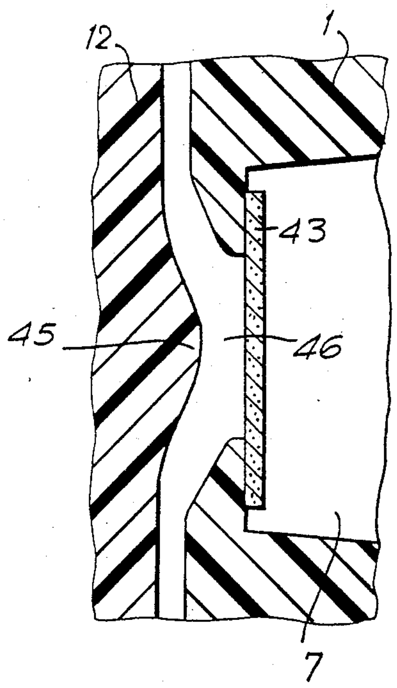

The vibratory plate 12 may have a projection 45, as shown in FIG. 20(B), to cause ink to flow at a uniform speed.

The filter 43 serves to block small air bubbles arriving thereat, and should have apertures of a diameter of 15 microns or smaller so as to be effectively used. If air bubbles having a diameter exceeding 15 microns entered the ink passageways in the ink ejection mechanism, they would absorb the pressure to be generated in the ink passageways, thus preventing stable ink ejection. Small air bubbles having a diameter of 15 microns or less can pass through the filter 43, but do not have an appreciable effect on ink ejection provided they are relatively few. Such small bubbles have a tendency to be dissolved in the ink prior to arrival at the nozzles unless the ink is continously ejected, however, no continous ink ejection is carried out in normal printing operation of an on-demand printer.

When the ink container 8 is stored in an inverted position or a turned-over position, the filter 43 is not filled with ink. However, the ink passage 47 as shown in FIG. 22(A) or 22(B) enables the ink 35 to be led under capillary attraction to the filter portion which is considerably higher than the ink level. Therefore, even after the ink has been evaporated from the ink passageways, ink can be supplied from the ink container through the ink passage 47 with no danger of any air bubbles growing in the ink passageways. The ink passage 47 may not extend to the filter 43, and inner corners of the ink container 9 can provide capillary attraction so as to serve as extensions of the ink passage 47. Thus, these inner corners are always kept wet with ink to provide ink supply passages extending from the ink level to the filter 43 no matter what postures the ink container 8 is tilted in.

Still another embodiment of the present invention will be described with reference to FIG. 18. An ink container 8 is divided by a vertical partition 88 into a main chamber 86 and an auxiliary chamber 87, there being a passage 89 communicating between the chambers 86, 87 to equalize the pressures therein with atmospheric pressure. The main and auxiliary chambers 86, 87 are interconnected by an ink passage 83 for allowing ink to flow therethrough. The vertical partition 88 and the substrate 1 are closely spaced from each other by a distance ranging from 0.7 to 2 mm so that the ink level in the auxiliary chamber 87 is higher than that in the main chamber 86 due to capillary attraction. An ink supply port 7 communicating with a printer head may be larger in area than the ink passage 83. The vertical partition 88 has an upper ink limit indicator plate 37 located such that the ink in the main chamber 86 will not flood over the vertical partition 88 at the time of printing operation.

With the foregoing construction, air bubbles fail to flow into the ink passage 83 in the manner described with reference to the embodiment of FIG. 17. Since the auxiliary chamber 87 is a narrow space, substantially no air bubbles are generated in the auxiliary chamber 87. Due to the difference between the surface areas of the main and auxiliary chambers 86, 87, the ink flows at a low speed in the auxiliary chamber 87, and any small air bubbles therein will disappear before they reach the ink supply port 7.

Figure 18:
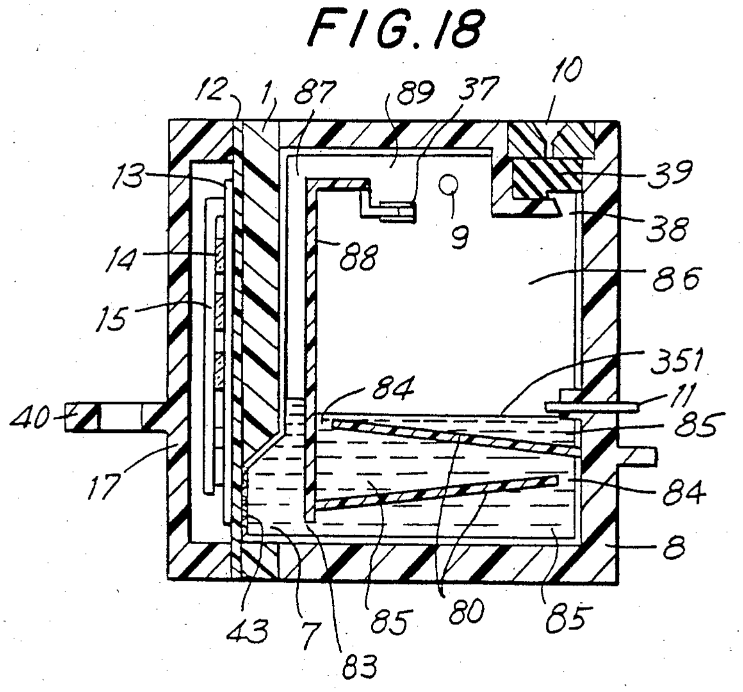
FIG. 18 is a sectional view of another alternative embodiment of an integral construction including a head and ink container in accordance with the invention.

In the embodiment of FIG. 18, the slanted partitions 80 are located in position without involving any reduction in the quantity of ink used even where the ink supply port 7 is large and high due to a design limitation. When the ink container 8 is subjected to accelerated movement, the auxiliary chamber 87 can absorb any pressure buildup in the ink supply port 7 which is caused by the mass of the ink in the main chamber 86 acting in the ink passage 83, thereby permitting stable ink ejection.

Now, cap means for covering the nozzles in an ink jet head integral with the ink container as described above, pump means for pressurizing ink in the ink container, and vent hole cover means for selectively closing the vent hole in the ink container, and a series of operations thereof are described.

Figure 9:
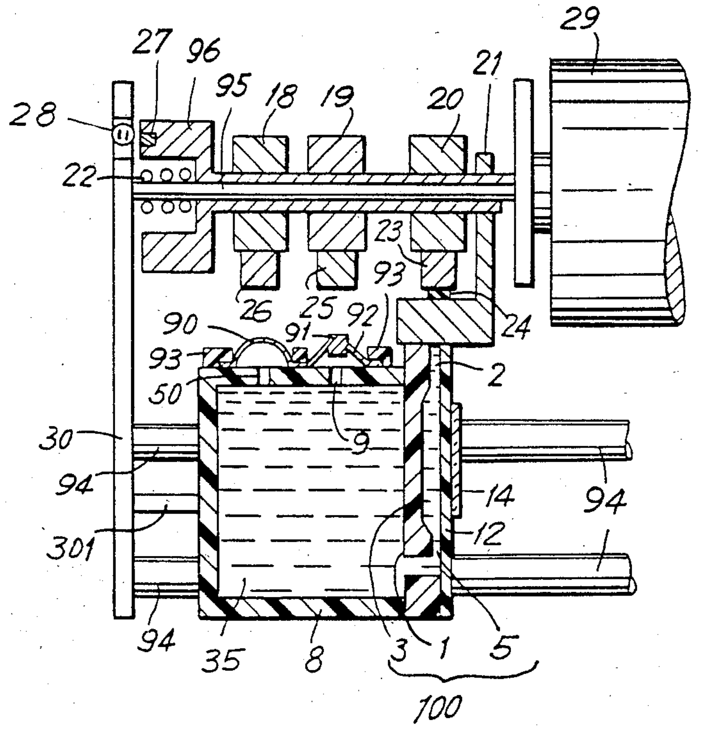
FIG. 9 is a sectional view of a mechanism including a nozzle cover, vent hole cover, and pump.

FIG. 9 is a sectional view of a mechanism having such means, the view being from above the mechanism.

A substrate 1 of polysulfone or ABS resin has nozzles 2, pressure chambers 3, and an ink supply port 5, all defined as grooves in a surface of the substrate 1. A vibratory plate 12 made of polysulfone or ABS resin is placed on the substrate 1, and piezoelectric elements 14 are bonded to the vibratory plate 12. These components jointly constitute a printer head 100. An ink container 8, made of polysulfone or ABS resin, has a volume of about 10 ml and is bonded to the substrate 1 with 6 ml of ink at maximum contained therein. The ink container 8 has a vent hole 9 defined in an upper portion thereof and having a diameter of 0.8 mm, and a pump hole 50 defined adjacent to the vent hole 9 and having a diameter of 0.4 mm. The diameter of the vent hole 9 is relatively large to allow the interior of the ink container 8 to be sufficiently vented when the vent hole 9 gets wet. The diameter of the pump hole 50 is relatively small to prevent ink from being evaporated therethrough. A pump 90 is made of butyl rubber having a low ratio of vapor permeability and has a semispherical shape having a diameter of 5 mm. A vent hole cover 91 is formed integrally with the pump 90 and has an air vent 92. The pump 90 and the vent hole cover 91 are secured to the container 8 by an attachment frame 93 constructed of polysulfone. The substrate 1, vibratory plate 12, ink container 8 and attachment frame 93 are bonded together by solvent. The ink container integral with the printer head is supported on a carriage (not shown) and moveable thereby along guide shafts 94. A cam shaft 95 has a knob 96 mounted thereon with cams 18, 19, 20 and a cleaner 21 attached thereto for rotation with the knob 96. A coil spring 22 has one end fixed to the knob 96 and is disposed around the cam shaft 95 so as to serve as a spring clutch to allow the knob 96 to rotate in one direction only. The mechanism also includes a cover lever 23, a nozzle cover 24 of silicone rubber attached to the cover lever 23, a vent hole lever 25, and a pump lever 26. The cover lever 23, the vent hole lever 25, and the pump lever 26 are actuated by the cams 18, 19, 20, respectively, on rotation of the knob 96 for opening and closing the covers and driving the pump 90. Springs for pressing the cover lever 23, the vent hole lever 25, and the pump lever 26 against the corresponding cams are omitted from illustration in FIG. 9. A magnet 27 is embedded in the knob 27 and a reed switch 28 is mounted on a frame of a printing device. The magnet 27 and the reed switch 28 serve to detect the rotational position of the knob 96. A platen 29 is positioned on the righthand side of the above covers, cleaner, and other components. The frame 30 has an abutment 301 located for abutting engagement with the ink container 8.

Operation of the mechanism shown in FIG. 9 is now described with reference to the cam diagram of FIG. 10.

For normal printing operation, the recording head is reciprocably moved laterally in confronting relationship to the platen 29 for ejecting ink onto a sheet of recording paper (not shown) set on the platen 29. At this time, the angle of rotation of the cam shaft about its own axis is A1=0° as shown in FIG. 10. The nozzle cover 24 is spaced from the nozzles 2 as shown by the line N.C. which indicates movements of the cover lever 23. Upward movements of the levers will hereinafter be defined as movements away from the head and the ink container. Likewise, the vent hole lever 25 is spaced from the vent hole cover 12 as indicated by the line V.C. The pump lever 26 is spaced from the pump 11 as indicated by the line P. The cleaner 21 is spaced upwardly from the nozzle cover 24 as shown by the line C. The reed switch 28 is closed (ON) as shown by the line R.S. The shape of the cleaner 21 and the positional relationship thereof with respect to the nozzle cover 24 and the nozzles 2 is described hereinafter.

Upon the elapse of two seconds after information to be printed has all been delivered from a control circuit (not shown), the head 100 is moved to the left by a DC motor (not illustrated) until it abuts against the abutment 301. Immediately thereafter, the current supplied to the DC motor is cut off to keep the head 100 and the ink container 8 stopped in a predetermined position. If the user wants to stop operation of the printing device, then the knob 96 should be rotated in a prescribed direction. In synchronism with rotation of the cams, the cleaner 21 is rotated as shown in FIG. 10 to clean the nozzles 2 and the nozzle cover 24 as illustrated in FIG. 11. Rotation of the knob 96 about the cam shaft 95 causes corotation of the cleaner 21. The cleaner 21 includes a lever having a distal end to which a leaf spring 114 made of SUS is fused, the leaf spring 114 supporting a wiper blade 115 of butyl rubber attached to a distal end thereof. As the knob 96 rotates, the surface of the nozzle cover 24 is wiped by the leaf spring 114, and at the same time the front surface of the nozzles 2 is wiped by the wiper blade 115. While the nozzles 2 are being wiped by the cleaner 21, the vent hole lever 25 is advanced as shown by the line V.C. to press the vent hole cover 91 against the vent hole 9, thereby closing the latter.

When the knob 96 has rotated through the angle A2=160°, the nozzles 2 remain open and the vent hole 9 is closed. In this position, purging (described later) is rendered possible. Further rotation of the knob 96 pushes the pump 90 and moves the nozzle cover 24 toward the nozzles 2. Therefore, the ink 35 in the ink container 8 is pressurized to force a small amount of the ink 35 to flow out of the nozzles 2 through the ink supply port 5 and the pressure chambers 3. The pump 90 is designed to provide a displacement such that the pressure in the ink container 8 will be increased by 1 through 10 $cmH_2O$ (about 100 Pa through 1 KPa). When the pressure increase is 2 $cmH_2O$ (about 200 Pa), the quantity of the ink 35 egressing from the nozzles 2 is on the order of 0.01 ml, an amount which is sufficient only to make the ink 35 swell (deform outwardly) on the front surface of the nozzles 2. The pump 90 is continuously pressurized for a few tens through a few hundreds ms while at the same time the nozzles 2 are being closed by the nozzle cover 24. Thereafter, the pump lever 26 is retracted.

At the angle A3=270° of rotation of the knob, the nozzles 2 are completely closed by the nozzle cover 24. Under this condition, the nozzle cover 24 and the vent hole cover 91 are closed to keep the ink within the head 100 and ink container 8 from flowing out and evaporating. In this position, the printing device can be stored or transported.

When operation of the printing device is to be resumed, the knob 96 is rotated to open the vent hole 9 to vent the interior of the ink container 8 to atmosphere, and then the nozzle cover 24 is opened. At the angle A1, the reed switch 28 is turned on to put the non-illustrated control circuit in an operable condition.

At the angles A1, A3, the pump lever 26 abruptly changes its direction of movement from retraction to advance as shown by the line P. This movement of the pump lever 26 has no direct bearing on pump operation, but serves to give a "click" to the rotation of the knob for imposing a pressing force on the cam to thereby stabilize the knob stop position.

The levers and the cams illustrated in FIG. 9 are now described in detail. The cover lever 23 is shown by the two-dot-and-dash lines in FIG. 11. The cover lever 23 is rotatable about a lever shaft 116 and supports on its distal end the convex nozzle cover 24 of silicone rubber. A spring 118 has an end engaged by a pin 117 on the cover lever 23 and an opposite end engaged by a portion 302 of the frame of the printing device for urging the cover lever 23 against the cover 24. The cover lever 23 is displaced by the cam 20 which is fragmentarily shown in FIG. 11.

Figure 12:
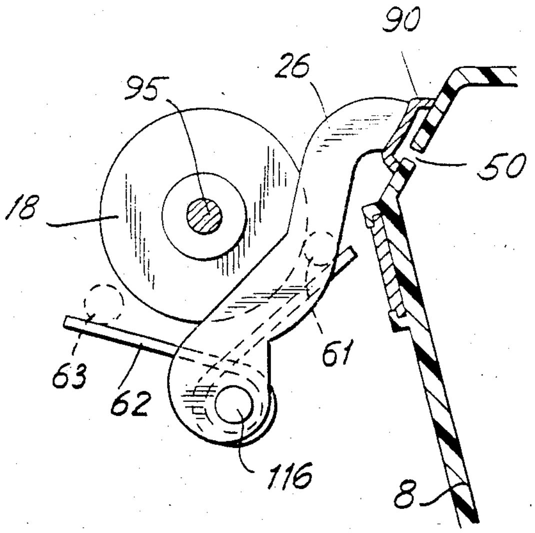
FIG. 12 is a side elevational view, partly in section, illustrative of operation of the pump shown in FIG. 9.

FIG. 12 illustrates the pump lever 26. The pump lever 26 has a pin 61, and the vent hole lever 25 has a pin 63. A spring 62 is held in engagement with the pins 61, 63 for pressing the pump lever 26 agaisnt the cam 18. The cam 18 enables the pump lever 26 to push the pump 90. The ink container 8 has a pump hole 50 defined downwardly of the pump 90 for allowing any ink to flow from the pump 90 back into the ink container 8.

Figure 13:
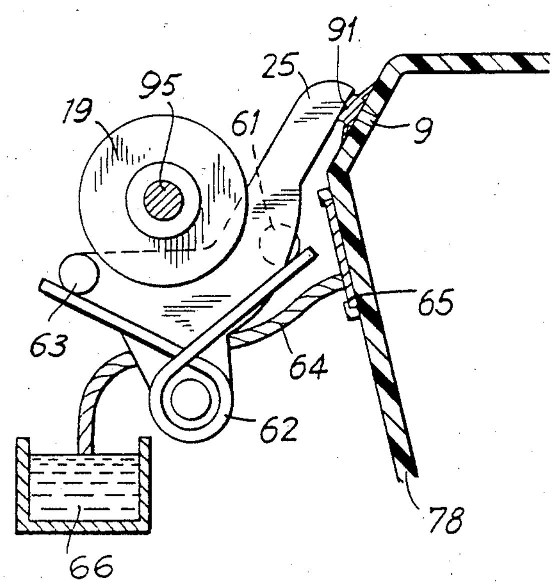
FIG. 13 is a side elevational view, partly in section, showing operation of the vent hole cover of FIG. 9.

FIG. 13 shows the vent hole lever 25. The vent hole lever 25 is biased by the spring 62 shared by the pump lever 26 to push the vent hole cover 91. An ink conduit 64 is moveable with the vent hole lever 25 into and out of contact with a spongy ink retainer 65 mounted on the ink container 8 and extending from a position below the nozzles 2 to a position below the vent hole 9. The ink conduit 64 is composed of bundled fibers and has a lower end communicating with a discharge ink cartridge 66 having an absorbent therein. Any ink flowing out of the nozzles 2 and the vent hole 9 is finally gathered in the discharge ink cartridge 66, which is replaced with another discharge ink cartridge as desired.

Figure 10:
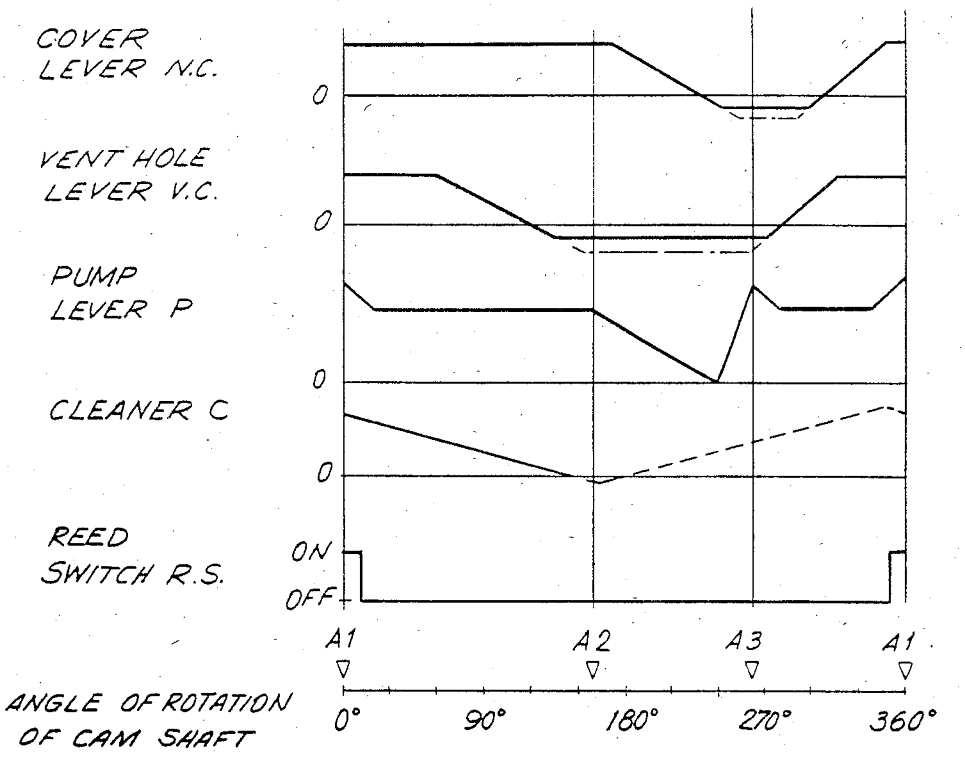
FIG. 10 is a timing chart (cam diagram) showing operations of the mechanism illustrated in FIG. 9.
Figure 11:
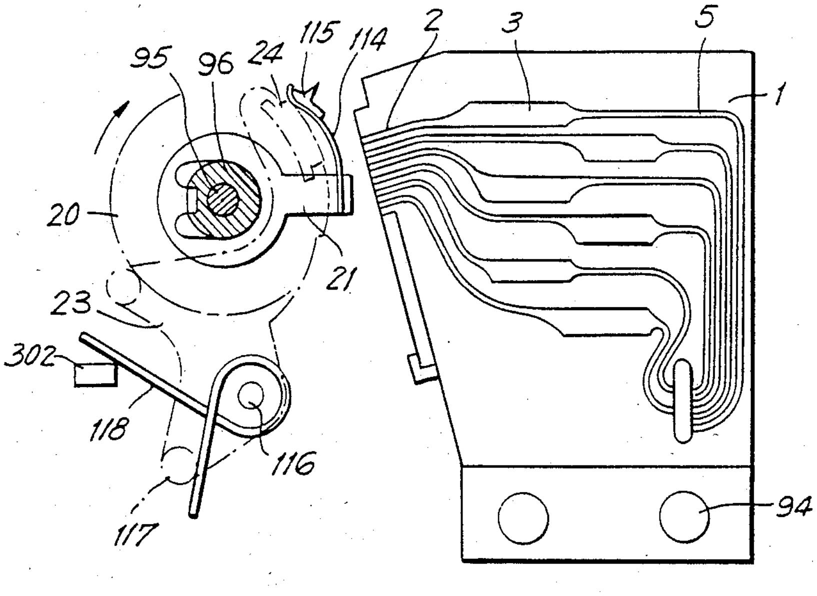
FIG. 11 is a side elevational view, partly in a section of the nozzle cover and cleaner mechanism shown in FIG. 9.

The purging effected at the angle A2 in FIG. 10 is now described. Purging is necessary when air bubbles are generated in the pressure chambers 3 or the nozzles 2 are clogged so as to disable ink ejection. When no ink ejection is possible at the angle A1, the user inserts the ink cartridge 51 into the ink charging port 10 as shown in FIG. 14 and depresses a piston 53 to charge ink 35 to a level below the nozzles. Thereafter, the knob 96 is rotated through the angle A2, and the piston 53 is further depressed. Since the vent hole 9 is closed at this time, the pressure in the ink container 8 is built up to force the ink 35 out of the nozzles 2 to remove any clog and air bubbles. The ink cartridge 51 has a distal cylinder end 54 serving to provide a seal against ink leakage between the needle 52 and a rubber plug 32 due to a pressure increase in the ink container 8 which is pressurized by the depression of the piston 53.

The ink is charged at the angle A1 in order to reduce the amount of air 82 in the ink container 8 to facilitate a pressure buildup therein at the time of purging. Ink replenishment necessitated by normal ink consumption is performed at the angle A1 when the vent hole 9 remains open.

With the construction illustrated in FIGS. 9 through 13, the nozzles are covered by the nozzle cover while the ink is flowing out of the nozzles, eliminating entrapment of air bubbles in the nozzles which would otherwise be caused by an ink meniscus in the nozzles or irregular wetting of the cover. Since the pump pressure is a few $cmH_2O$, air bubble entrapment is held to a minimum while substantially eliminating the amount of ink flowing out, and hence no waste ink is consumed. The nozzle cover is made of silicone rubber and convex in shape, an arrangement which is effective in preventing air bubbles from being entrapped due to uneven wetting of the nozzle cover. The levers, being operated by the cams rotating in one direction, can easily be controlled in desired conditions against the tendency of flapping in front of the nozzles and trapping air bubbles. Since the cover and the nozzles are simultaneously cleaned by the cleaner which rotates in synchronism with the corresponding cam, no dirt or dust is present between the nozzles and the cover and ink is protected from flowing out and evaporation. With a single cleaner used for cleaning the cover and the nozzles, the number of parts required for such cleaning is reduced.

There is provided signalling means for detecting, with angles of rotation of the knob, the retraction of the nozzle cover and the vent hole cover and readiness for printing operation. This signalling means prevents the printing operation from being started with the covers closed. Where the covers are left open for a long period of time without any printing operation being effected, a signal indicative of no printing operation and another signal indicative that covers are being open can be monitored for a certain interval of time to produce an alarm signal.

The nozzle cover and the vent hole cover can be selectively opened and closed to easily establish conditions suitable for printing operation, purging, and storage.

The printing operation is initiated after the vent hole cover has been released and then the nozzle cover has been released to vent the interior of the ink container to atmospheric pressure. This prevents defective ink ejection which would otherwise be occasioned by a pressure change in the ink container due to a variation in the ambient temperature during storage of the printing device.

Since the vent hole cover and the pump are attached in intimate contact with the ink container and can be pushed by the respective levers, there is no danger of foreign matter such as dirt getting stuck to the vent hole and the pump hole, and printing operation is rendered stable. The ink conduit movable in synchronism with the vent hole cover discharges any ink flowing out of the vent hole into the discharge ink cartridge. The interior of the printing device is thus protected from smearing with ink.

The nozzles and the vent hole cover are positionally aligned with the associated levers by the motor forcing the carriage against the abutment. No complex position detector and complicated motor control are required, and good positioning accuracy is ensured.

While in the foregoing embodiments the nozzles are covered through operation of the cam while the ink is flowing out, another sequential operation may be employed. For example, the nozzles are first covered, and then the ink in the head is pressurized at a pressure of about 200 cm$H_2O$ (about 200 Kpa) to force the nozzle cover open for allowing air bubbles to flow, together with ink, from a gap between the nozzle cover and the nozzle surface. This modification results in an increased amount of consumed ink, but is advantageous in point of mechanism because of the simplified sequence.

Although in the above embodiments a diaphragm pump of rubber is used, various other pumps such as a piston pump may be employed, or ink may be pressurized due to gravity.

The present invention is not only applicable to an ink-on-demand type ink jet printer incorporating piezoelectric elements, but also to an ink jet printer employing heating elements.

The ink charging cartridge 51 as shown in FIGS. 8 and 14 is different from an ordinary injector for medical use in that the piston 53 has a rounded end to be pushed and cannot be pulled out. The ink charging cartridge 51 is discarded when the contents are completely used. This avoids accidental charging of other liquids than ink into the cartridge. Since the piston 53 is prevented from being retracted after all the ink has been charged, no air bubbles flow back into the ink container through the nozzles 2.

FIG. 15 shows another ink charging cartridge having a different configuration. A piston 53 has teeth 56 on an outer periphery thereof and is held in mesh with a check pawl 57, providing additional means to prevent the piston 53 from being pulled out.

FIG. 16 illustrates still another ink charging cartridge having a cartridge case 71 made of hard plastics and an ink bag 72 of soft plastic disposed in the cartridge case 71. A cover 73 is attached to a side of the ink bag 72. The ink bag 72 contains a body of ink 35 therein. The cartridge case 71 has an ink outlet port 75 surrounded by an externally threaded neck. An ink container 8 has an ink inlet port 76 having an internally threaded surface to be threaded over the externally threaded neck of the cartridge case 71 for communication between the ink output port 75 and ink inlet port 76. A check valve is composed of a plastic ball 77 and a spring 78 for preventing ink from flowing back into the ink charging cartridge.

The integral construction composed of the head and the ink container in accordance with the present invention includes various improvements. One such improvement is directed to the vent hole in the ink container. If the vent hole were wetted with ink, it could no longer vent the interior of the ink container to the atmosphere. Therefore, provision should be made to prevent such a problem. A vent hole 9 shown in FIG. 28 (A) has a cross-sectional shape flaring outwardly and includes an inner surface and adjacent surfaces 901, shown hatched, coated with Teflon to repel ink. The vent hole may otherwise be provided in an ink repellant material such as Teflon. A groove 902 extends along a wall surface of the ink container 8 in contact with the vent hole 9. The groove 902 has a cross-sectional shape capable of being wet with ink at all times due to capillary attraction. An ink absorbent means 903 of a porous material is disposed in an end of the groove 902 remote from the vent hole 9. Any ink attached to the surface of the vent hole 9 flows into the groove 902 under capillary attraction and is absorbed by the ink absorbent means 903. The ink in the vent hole 9 is thus removed to allow the latter to communicate with the exterior of the ink container 8. When not in use, a cap 904 is attached to the ink container 8 in covering relationship to the vent hole 9 to prevent any ink from being evaporated through the vent hole 9.

FIG. 28(B) shows another embodiment in which the bottom of a groove 902 is inclined so that its cross-sectional shape varies continuously. The smaller the cross-sectional shape of the groove 902, the greater the surface tension of the ink in the groove 902. Therefore, the ink in the groove 902 flows more quickly in the groove 902 than it does in the groove shown in FIG. 28 (A). Instead of inclining the groove bottom, the groove may have discrete different cross-sectional shapes for enabling ink to move rapidly in the groove.

FIG. 28 (C) illustrates still another embodiment in which the wall surface of an ink container has a hole 905 in contact with a vent hole 9, the hole 905 receiving therein an ink absorbent means 903. The hole 905 may have a varying cross-sectional shape to greater advantage.

Figure 29A:
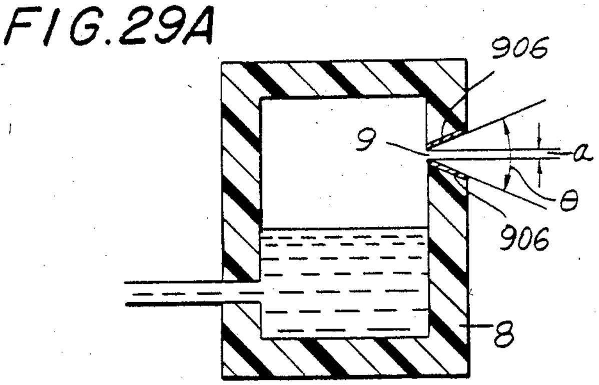
FIGS. 29(A) and 29(B) are cross-sectional views of vent holes of still other embodiments.

Still other embodiments are described with reference to FIGS. 29(A) and 29(B). These embodiments are characterized in that the vent holes are coated with defoaming agent. FIG. 29(A) is a cross-sectional view of a vent hole of still another embodiment. The ink container 8 is made from resin such as polysulfone, polyethersulfone, etc., since preferably the material is transparent, easily formable and chemical proof. The ink container 8 has a vent hole 9. The vent hole 9 may take any configuration, however, a tapering hole, which is effective for preventing ink from remaining therein, is suitable.

The greater are the vent hole diameter a and the cone angle $\theta$, the more difficult is the retention of ink in the vent hole. However, this is followed by an increase in ink dropping or evaporating from the vent hole 9. It is therefore advantageous to adjust the diameter a and the angle $\theta$ in the range of a=0.5 to 5 mm and $\theta$=60° to 160°.

Reference numeral 906 denotes a coating layer of defoaming agent, with which the inside of the vent hole 9 is coated. It is allowable to use as a defoaming agent any of the following substances: a non-ionic surfactant having at most 5 HLB value, e.g. sorbitan fatty acid esters such as sorbitan sesquioleate or a variety of polypropylene glycol surfactants; a partial ester of polyhydric alcohol and fatty acid; a high polymer surfactant of block polymer of propylene oxide and ethylene oxide; higher alcohol; silicon defoaming agents; acetylene glycol; and acetylene alcohol, etc.

By coating the inside of the vent hole 9 with one of the above-noted defoaming agents, a desirable effect is obtained. Furthermore, if the inside of the vent hole 9 is coated with a defoaming agent solved or dispersed into a solvent which solves the material forming the vent hole 9, durability of the coating layer is enhanced.

To be more concrete, in a case where the material forming the vent hole 9 is polysulfone resin, if Surfynol 104 (available from Air Products and Chemicals Inc.), which is acethylene glycol series defoaming agent, is solved into triethylene glycol monomethyl ether by about 30 weight percent, and the resultant substance is adhered to the inside of the vent hole 9 and dried at 70° C., then a durable coating layer of the defoaming agent can be attained. It is also possible to use silicon defoaming agents for coating therewith the inside of the vent hole 9. In this case, if one of KM series defoaming agents such as KM 68, KM 70, KM 71, KM 72, etc. (available from SHINETSU SILICONE Co., Ltd.) is attached to the inside of the vent hole 9 and dried, a coating layer is achieved.

The vent hole 9 opened to the air is often closed due to the capillary force of the ink attached to the vent hole 9 while the ink container 8 is moved or replenished with ink. However, when the inside of the vent hole 9 is coated with a defoaming agent as shown in FIG. 29(A), the ink membrane formed at the narrow portion of the vent hole 9 due to surface tension is broken immediately after contact between the coating layer and the ink, as a result the interior of the ink container 8 is quickly restored to the condition wherein atmospheric pressure is applied thereto. Accordingly, the recording head always remains in a stable condition, and hence, printing is satisfactory. The vent hole 9 of the ink container 8, when not used, is capped to prevent ink vaporization.

In the embodiment of FIG. 29(A), a series of tests were performed evaluating two types of coating layers. One layer is formed by solving Surfynol 104 into triethylene glycol monomethylether, coating the inside of the vent hole 9 with the resultant substance and drying the same. The other layer is formed by coating the inside of the vent hole 9 with a silicon defoaming agent and drying the same. In every test, the ink container was moved such that the inside of the vent hole 9 might be wetted with ink. As a result of 100 repetitive tests, there was no phenomenon of blockage of the vent hole 9 with ink in both cases with the above-mentioned two types of coating layers. In contrast, unless the vent hole 9 was coated with some defoaming agent, the vent hole 9 was closed with ink after only one test.

Figure 29B:
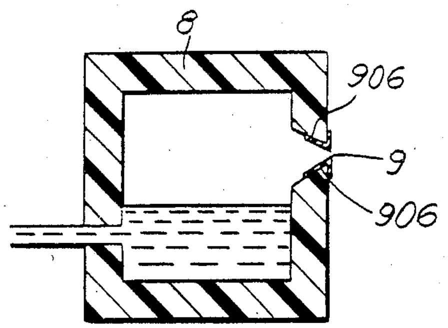

FIG. 29(B) is a cross-sectional view of a vent hole of still another embodiment. The ink container 8 has inverted-tapering vent hole 9. The coating layer 906 of a defoaming agent is formed on the inside of the vent hole 9 and on a portion contiguous to the outlet of the vent hole 9.

Again in the embodiment of FIG. 29(B), the vent hole 9 is prevented from being closed with ink as a result of a coating layer of a defoaming agent. As compared with the embodiment shown in FIG. 29(A), less ink drips from the vent hole 9 and the area of the cap for the vent hole 9 is smaller in the embodiment of FIG. 29(B).

As described above, even if the ink remains in the vent hole 9 after the ink container is moved or replenished with ink, since the inside of the vent hole is coated with a defoaming agent, the ink membrane formed in the vent hole 9 due to surface tension is immediately broken. Accordingly, the vent hole 9 is always opened to the air so that the interior of the ink container 8 is not subject to pressure variation. Printing is thus stably carried out.

According to a still further embodiment shown in FIG. 30, a stream of air is ejected from an air nozzle 109 to blow ink off the vent hole 9.

Figure 31:
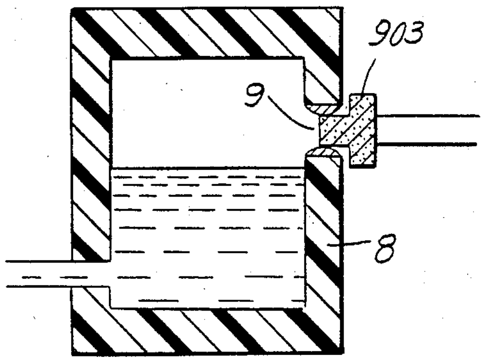

FIG. 31 is illustrative of still another embodiment in which an ink absorbent means 903 is drivable, for examples, by a piston, cam, or an electromagnetic solenoid (not shown) into the vent hole 9 for absorbing any ink in the vent hole. Where the ink absorbent means 903 is free from elastic deformation, it is preferable for it to have a configuration insertable in the vent hole as illustrated in FIG. 31. In case the ink absorbent means 903 is made of a deformable material, it may be of any desired profile.

Figure 32:
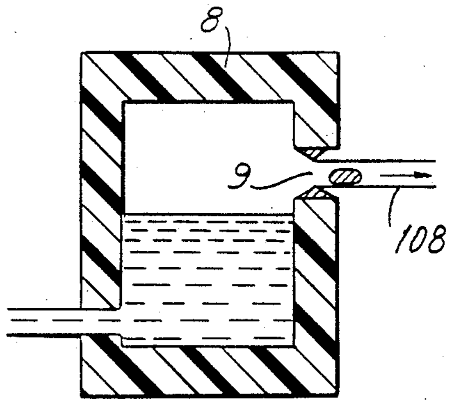

According to an embodiment of FIG. 32, a suction nozzle 108 connected to a suction pump (not shown) is inserted in the vent hole 9 for drawing ink from the vent hole 9. Where the suction nozzle 108 has a larger inlet opening than the vent hole 9, the suction nozzle 108 is held in close contact with the wall surface of the ink container for sucking ink from the vent hole 9. The suction nozzle 108 may be employed to draw ink from the ink absorbent members shown in FIGS. 28(B) and 28(C).

With the construction illustrated in FIGS. 28 through 32, ink does not easily get trapped in the vent hole while the ink container is being carried around or is being replenished with ink. Any ink in the vent hole can easily be removed. Therefore, the vent hole remains vented to atmosphere substantially at all times to allow the interior of the ink container to be equalized to atmospheric pressure. This enables stable printing operation regardless of pressure or temperature variations to which the printing device is subjected.

The present invention is applicable not only to serial printers, but also to other printing devices such as line printers, facsimile receivers, copiers, and plotters, for example.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An ink-on-demand type ink jet printer comprising an ink jet head assembly having a printer head and an ink container integrally joined to said printer head, said printer head including a pressure chamber and ink supply and ejection flow passages communicating respectively therewith, said ink container having therein a narrow air-bubble blocking tube opening directly into a lower portion of the interior of the ink container and connecting said ink supply flow passage to said ink container and, a vent hole defined in an upper portion thereof, and a wall surface, said wall surface not trapping air bubbles, a surface of said vent hole being coated with a defoaming agent.

* * * * *